(12) United States Patent
Yi

(10) Patent No.: US 8,889,279 B2
(45) Date of Patent: Nov. 18, 2014

(54) BATTERY PACK

(75) Inventor: Sangil Yi, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 69 days.

(21) Appl. No.: 13/549,788

(22) Filed: Jul. 16, 2012

(65) Prior Publication Data

US 2013/0143075 A1    Jun. 6, 2013

(30) Foreign Application Priority Data

Dec. 2, 2011 (KR) .......................... 10-2011-0128669

(51) Int. Cl.
*H01M 2/10* (2006.01)
*H01M 2/00* (2006.01)
*H01M 2/02* (2006.01)

(52) U.S. Cl.
USPC ............. 429/99; 429/100; 429/163; 429/164; 429/186

(58) Field of Classification Search
None
See application file for complete search history.

(56) References Cited

U.S. PATENT DOCUMENTS

| | | | |
|---|---|---|---|
| 2004/0157115 A1* | 8/2004 | Bouffard et al. ................ | 429/56 |
| 2004/0257038 A1* | 12/2004 | Johnson et al. ............... | 320/116 |
| 2005/0164080 A1* | 7/2005 | Kozu et al. .................... | 429/176 |
| 2008/0286634 A1* | 11/2008 | Naito ............................... | 429/92 |
| 2009/0104516 A1* | 4/2009 | Yoshihara et al. ............ | 429/149 |
| 2009/0280401 A1* | 11/2009 | Kim ............................... | 429/120 |
| 2010/0047682 A1* | 2/2010 | Houchin-Miller et al. ... | 429/120 |
| 2010/0092850 A1* | 4/2010 | Ueda et al. ...................... | 429/99 |
| 2010/0221590 A1* | 9/2010 | Reber ............................. | 429/99 |
| 2010/0248016 A1 | 9/2010 | Hanawa et al. | |
| 2011/0169481 A1* | 7/2011 | Nguyen et al. ................ | 324/126 |

FOREIGN PATENT DOCUMENTS

| | | |
|---|---|---|
| JP | 2003-045504 A | 2/2003 |
| JP | 2009-110760 A | 5/2009 |
| JP | 2010-135273 A | 6/2010 |

OTHER PUBLICATIONS

Examiner Annotated Figure 7 of Ueda.*
Examiner Annotated Figure 9 of Ueda.*
Examiner Annotated Figure 7 of Ueda, (May 2013).*
Examiner Annotated Figure 9 of Ueda, (May 2013).*

* cited by examiner

*Primary Examiner* — Ula C Ruddock
*Assistant Examiner* — Matthew Van Oudenaren
(74) *Attorney, Agent, or Firm* — Lee & Morse, P.C.

(57) ABSTRACT

A battery pack includes: a plurality of batteries; a circuit board electrically connected to the batteries; a cell guide between adjacent ones of the batteries, the cell guide including a first cell guide and a second cell guide, and the first cell guide and the second cell guide being disposed perpendicular to each other; and a case accommodating the plurality of batteries and the circuit board.

19 Claims, 7 Drawing Sheets

BATTERY PACK

BACKGROUND

1. Field

Embodiments relate to a battery pack.

2. Description of the Related Art

In general, it may not be sufficient to use only one battery cell as a power source for a notebook computer, an electronically driven tool, an electric bicycle, or an electric scooter. Therefore, a battery pack, used as a power source for such an electronic device or electronically driven tool, may include a plurality of battery cells connected to each other in series/parallel.

In order to control charge and discharge states of battery cells and to avoid various risks associated with over-charge or over-discharge, the battery pack may include a protective circuit module.

SUMMARY

One or more embodiments may provide a battery pack including: a plurality of batteries; a circuit board electrically connected to the batteries; a cell guide between adjacent ones of the batteries, the cell guide including a first cell guide and a second cell guide, and the first cell guide and the second cell guide being disposed perpendicular to each other; and a case accommodating the plurality of batteries and the circuit board.

The first cell guide may include a support unit accommodating the batteries. One side surface of the first cell guide may be planar and may support the second cell guide thereon. The first cell guide may be integrally formed with the second cell guide. At least one side of the support unit may be connected to another support unit adjacent thereto. The support unit may have a shape corresponding to a shape of an outer surface of the batteries. The support unit may have a semicircular cross section. The second cell guide may have mounting portions, the mounting portions contacting outer surfaces of the batteries. The second cell guide may have a groove extending through a center thereof. A cross-sectional area of the groove of the second cell guide may gradually decrease in a direction toward the first cell guide. A thickness of each of the mounting portions may gradually increase in a direction toward the first cell guide.

One or more of the plurality of batteries may be in a first stack and a remainder of the plurality of batteries may be in a second stack. The first stack and the second stack may be disposed perpendicular to each other. The first stack and the second stack may be connected by connection tabs in series, in parallel, or in a combination of series and parallel connections. The connection tabs may electrically connect at least two of the batteries. Each of the connection tabs may include connection parts electrically connected to the batteries and a connector unit connecting the connection parts. Each of the connection tabs may include: first stack connection parts electrically connecting the batteries of the first stack; second stack connection parts electrically connecting the batteries of the second stack; and a connector unit connecting the first stack connection parts and the second stack connection parts.

The connector unit may include one or more bent portions corresponding in position to the first stack and the second stack. Each of the first stack connection parts and the second stack connection parts may include a predetermined number of connection parts electrically connecting a predetermined number of batteries. The connection tabs may be soldered or welded to the batteries. Each of the connection tabs may include a welding hole.

Additional aspects and/or advantages of the embodiments will be set forth in part in the description which follows and, in part, will be obvious from the description, or may be learned by practice of the invention.

BRIEF DESCRIPTION OF THE DRAWINGS

Features will become apparent to those of ordinary skill in the art by describing in detail exemplary embodiments with reference to the attached drawings in which.

DETAILED DESCRIPTION

Figure 1:
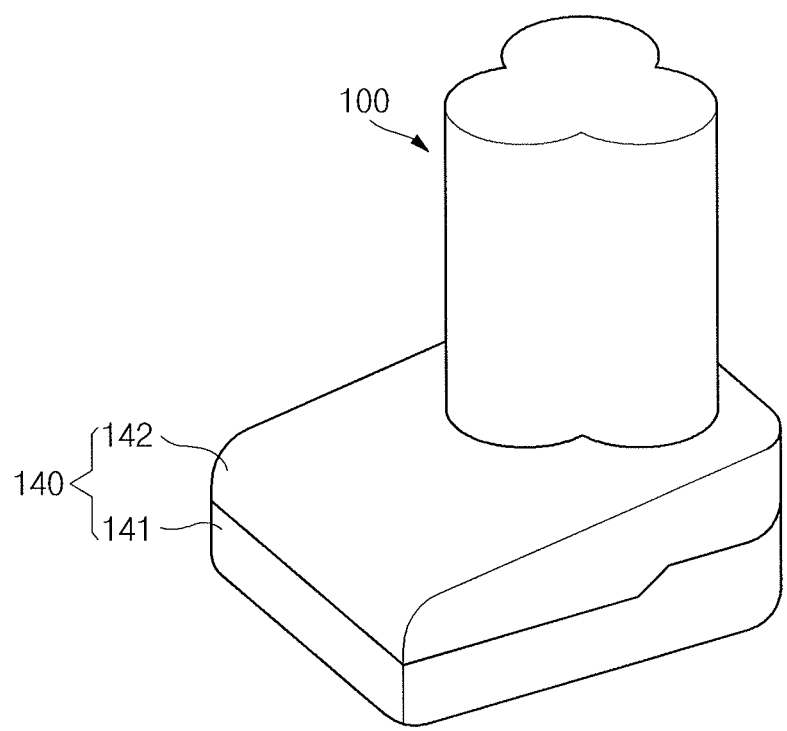
FIG. 1 illustrates a perspective view of a battery pack according to an embodiment.

Korean Patent Application No. 10-2011-0128669, filed on Dec. 2, 2011, in the Korean Intellectual Property Office, and entitled: "Battery Pack," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other layer or element, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

First, the battery pack 100 according to an embodiment will be described.

Figure 2:
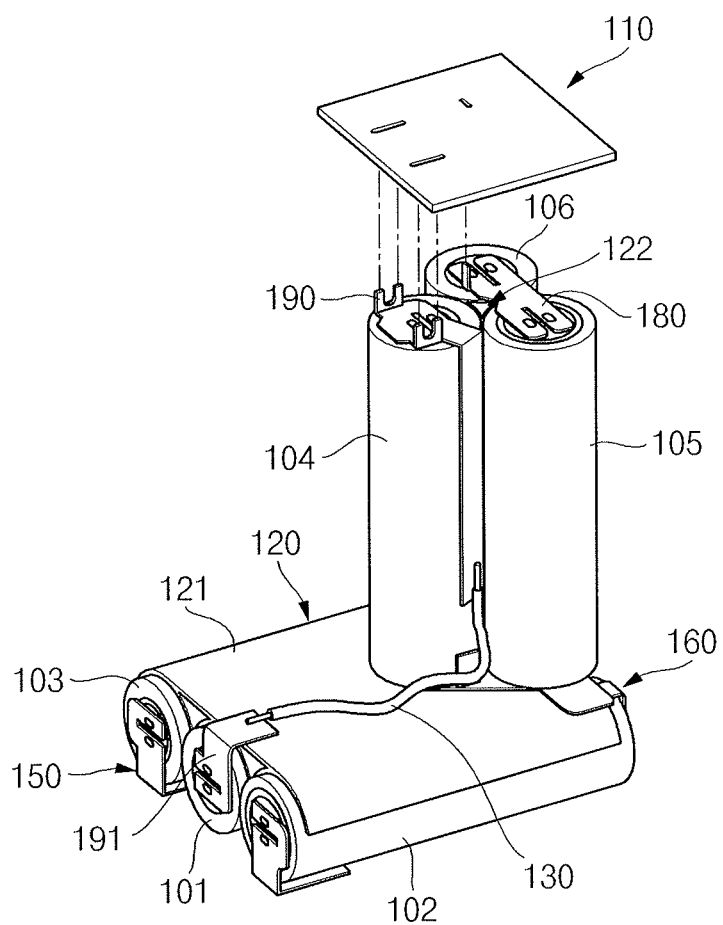
FIG. 2 illustrates a perspective view of the battery pack shown in FIG. 1 without a case.
Figure 3:
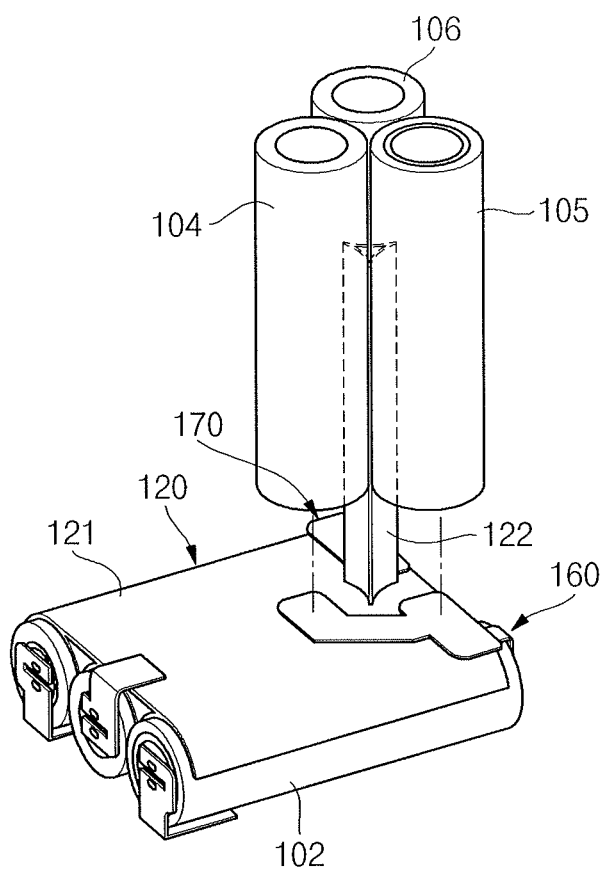
FIG. 3 illustrates an exploded perspective view of batteries separated from a second cell guide of the battery pack of FIG. 2.

FIG. 1 illustrates a perspective view of a battery pack according to an embodiment. FIG. 2 illustrates a perspective view of the battery pack shown in FIG. 1 without the case. FIG. 3 illustrates an exploded perspective view of batteries separated from a second cell guide of the battery pack of FIG. 2.

The battery pack 100 according to an embodiment may include a plurality of batteries 100a, a circuit board 110, a cell guide 120, a case 140 and a plurality of connection tabs 141. The plurality of connection tabs 141 may include a first connection tab 150, a second connection tab 160, a third connection tab 170, a fourth connection tab 180, a fifth connection tab 190 and a sixth connection tab 191. The plurality of batteries 100a may include a first battery 101, a second battery 102, a third battery 103, a fourth battery 104, a fifth battery 105 and a sixth battery 106.

The plurality of batteries 100a may be accommodated in the case 140, forming a module. The plurality of batteries 100a may be electrically connected to each other using the first through sixth connection tabs 150, 160, 170, 180, 190 and 191. The first through sixth connection tabs 150, 160, 170, 180, 190 and 191 may be electrically connected to the circuit board 110.

The plurality of batteries 100a may be connected in series or in parallel. A combination of series and parallel connections may be used, in which some of the plurality of batteries 100a may be connected in parallel and others may be connected in series. While the embodiment illustrated in the drawings include the battery pack 100 having six batteries, e.g., the first battery 101, the second battery 102, the third battery 103, the fourth battery 104, the fifth battery 105 and the sixth battery 106, the battery pack 100 may include any predetermined number of batteries disposed horizontally or vertically. The embodiments are not limited to the number of batteries illustrated, and various modifications may be made.

A first stack of batteries may be formed, which includes one or more of the first, second, and third batteries 101, 102 and 103, and a second stack may be formed, which includes one or more of the fourth, fifth, and sixth batteries 104, 105 and 106. The first stack of batteries including the first, second, and third batteries 101, 102 and 103 and the second stack of batteries including the fourth, fifth, and sixth batteries 104, 105 and 106 may be disposed perpendicular to each other.

The respective batteries in the first stack of batteries and the second stack of batteries may be connected by the connection tabs 150, 160, 170, 180, 190 and 191 in series, in parallel, or in a combination of series and parallel connections.

A description of the first battery 101 of the plurality of batteries 100a will be provided below by way of example. The first battery 101 may be a rechargeable cylindrical battery. The battery 101 may have any suitable shape. It should be understood that the battery 101 includes a top surface having a convex terminal, i.e., a positive electrode, and a flat bottom surface, i.e., a negative electrode. In addition, the convex terminal may be electrically connected to a positive electrode of an electrode assembly formed within the battery 101 and the flat bottom surface may be electrically connected to a negative electrode of the electrode assembly. A side surface of the battery 101 may be wrapped with a label made of an insulating material.

In addition, the battery 101 may be a lithium-ion battery, but aspects of the embodiments are not limited thereto. The battery 101 may also be a nickel-cadmium battery, a nickel metal hydride battery (NiMH), or the like.

The circuit board 110 may include an electric element (not shown) and a circuit pattern layer (not shown). The circuit board 110 may collect information concerning charged states or temperature states of the plurality of batteries 100a. The circuit board 110 may control charging/discharging operations of the plurality of batteries 100a. In addition, although not shown, the circuit board 110 may include an external terminal for connecting to an external device to perform charging/discharging operations.

Figure 4:
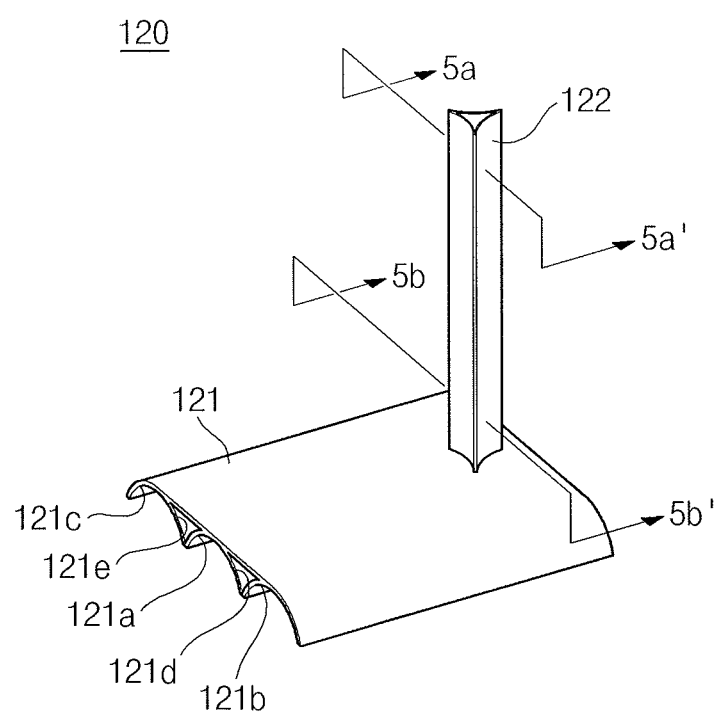
FIG. 4 illustrates a perspective view of a cell guide of the battery pack of FIG. 2.

FIG. 4 illustrates a perspective view of a cell guide of the battery pack of FIG. 2.

The cell guide 120 may include a first cell guide 121 and a second cell guide 122. The first cell guide 121 and the second cell guide 122 may be disposed perpendicular to each other.

In the cell guide 120, the first cell guide 121 and the second cell guide 122 may be integrally formed with each other. Thus, relative movement between the first cell guide 121 and the second cell guide 122 may be prevented, and improved stability may be achieved. Thus, the cell guide 120 may remain stable even when structural shocks are sustained, e.g., the structural strength of the battery pack 100 may be maintained even in the event of a drop shock or vibration.

The cell guide 120 may include a plastic material. The plastic material may include at least one of polyethylene (PE), polypropylene (PP), polyvinyl chloride (PVC), polystyrene (PS), polyethylene terephthalate (PETE) or the like. In addition, the cell guide 120 may include a material capable of absorbing shocks and protecting the plurality of batteries 100a, while also supporting them.

The first cell guide 121 may include support units 121a, 121b and 121c for accommodating the batteries. One side surface of the first cell guide 121 may be planar to provide a horizontal support surface upon which the second cell guide 122 may be disposed.

The support units 121a, 121b and 121c may be shaped to correspond to a shape of an outer circumferential surface of each of the batteries 101, 102 and 103 of the first stack. For example, if the battery 101 is a cylindrical battery, the support unit 121a may have a semicircular cross section. As a result, the support unit 121a may surround a portion of the outer circumferential surface of the battery 101, thereby preventing the battery 101 from being released from the battery pack 100, even when the battery pack 100 is subjected to external shocks.

In addition, the support units 121a, 121b and 121c may be formed such that at least one side of each of support units 121a, 121b and 121c is connected to an adjacent support unit. In addition, the first cell guide 121 may have through holes 121d and 121e formed at regions where the support units 121a, 121b and 121c are connected to each other, e.g., regions corresponding to spaces where the batteries 101, 102 and 103 of the first stack are positioned to be adjacent to each other. The through holes 121d and 121e may allow release of heat generated from the batteries 101, 102 and 103 of the first stack (according to charging/discharging operations). In addition, the through holes 121d and 121e may also absorb shocks applied to the battery pack 100.

Figure 5A:
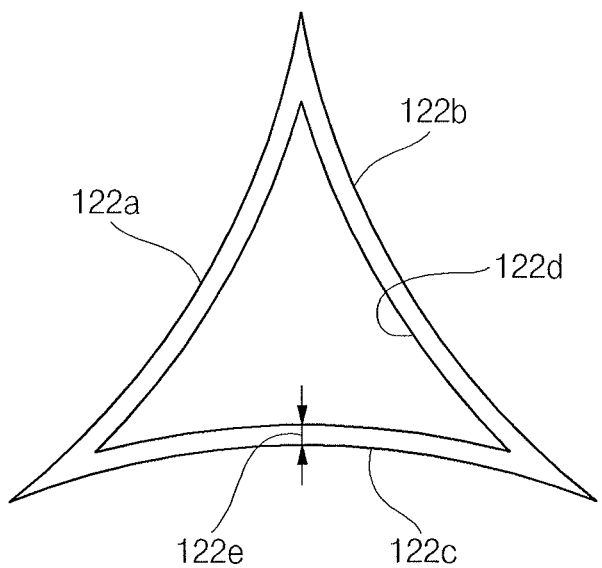
FIG. 5A illustrates a cross-sectional view taken along the line 5a-5a' of FIG. 4.
Figure 5B:
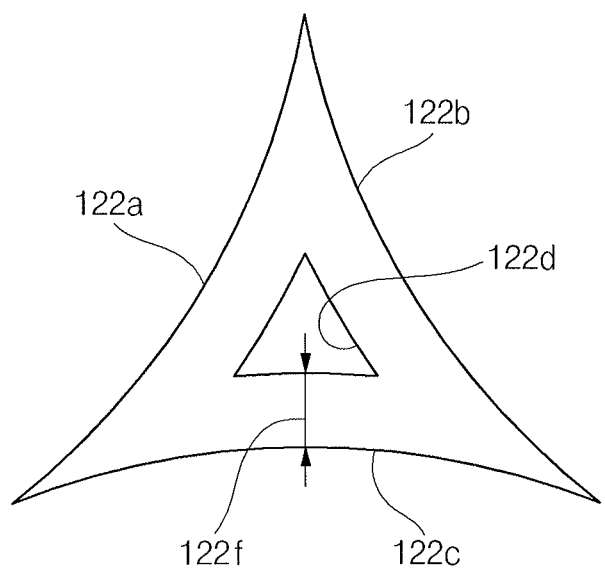
FIG. 5B illustrates a cross-sectional view taken along the line 5b-5b' of FIG. 4.

FIG. 5A illustrates a cross-sectional view taken along the line 5a-5a' of FIG. 4. FIG. 5B illustrates a cross-sectional view taken along the line 5b-5b' of FIG. 4.

The second cell guide 122 may have mounting portions 122a, 122b and 122c contacting outer circumferential surfaces of the respective batteries and may be formed by connecting the respective mounting portions 122a, 122b and 122c to each other. In addition, the second cell guide 122 may have a centrally formed groove 122d.

An upper portion of the second cell guide 122 is depicted in FIG. 5A. A lower portion of the second cell guide 122 is depicted in FIG. 5B. The upper portion of the second cell guide 122 depicted in FIG. 5A is further from the first cell guide 121 than the lower portion of the second cell guide 122 depicted in FIG. 5A. In order to secure structural stability of the first cell guide 121 and the second cell guide 122, the groove 122d of the second cell guide 122 may have a cross-sectional area that gradually decreases in a direction toward the first cell guide 121. For example, a thickness of the mounting portions 122a, 122b and 122c gradually increases in a direction toward the first cell guide 121. For example, a first thickness 122e of the mounting portions 122a, 122b and 122c may be less than a second thickness 122f of the mounting portions 122a, 122b and 122c. The second cell guide 122 may be connected to the first cell guide 121, such that the second cell guide 122 and the first cell guide 121 are perpendicular to each other. The second cell guide 122 may prevent the connection tabs 150, 160, 170, 180, 190 and 191 from breaking, even when external shocks are sustained, and may prevent contact failures between batteries.

The case 140 may include a lower case 141 and an upper case 142. The case 140 may have various shapes, in accordance with the shapes of the plurality of batteries accommodated therein or the shapes of electronically driven tools for which they will be used. While the drawings show the lower case 141 and the upper case 142 assembled with each other, the shape of the case 140 is not limited to that shown. In addition, although not shown, the case 140 may have an external terminal hole through which an external terminal connected to the circuit board 110 may be exposed.

Figure 6A:
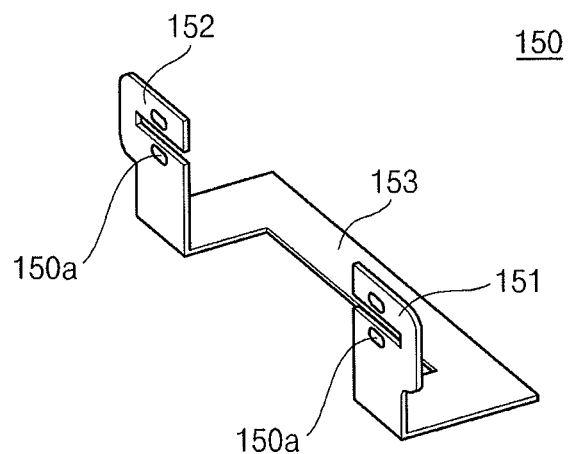
FIG. 6A illustrates a perspective view of a first connection tab of the battery pack of FIG. 2.
Figure 6B:
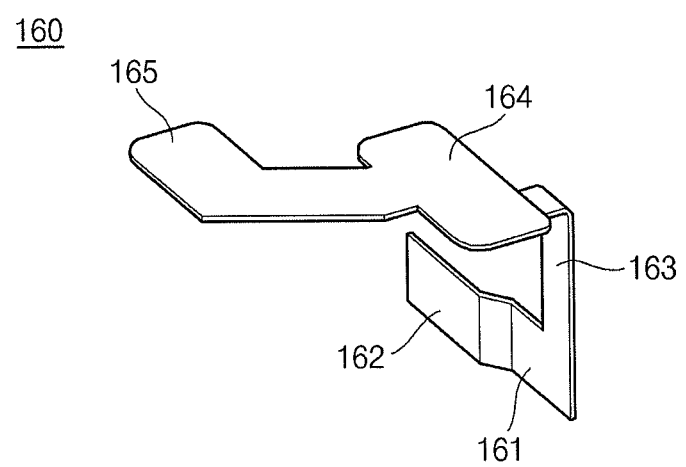
FIG. 6B illustrates a perspective view of a second connection tab of the battery pack of FIG. 2.
Figure 6C:
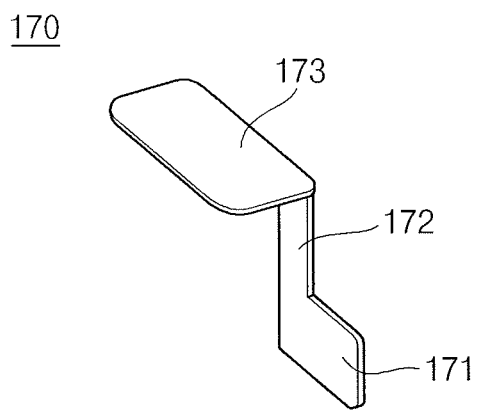
FIG. 6C illustrates a perspective view of a third connection tab of the battery pack of FIG. 2.

FIG. 6A illustrates a perspective view of the first connection tab of the battery pack of FIG. 2. FIG. 6B illustrates a perspective view of the second connection tab of the battery pack of FIG. 2. FIG. 6C illustrates a perspective view of the third connection tab of the battery pack of FIG. 2.

Each of the first to sixth connection tabs 150, 160, 170, 180, 190 and 191 may include connection parts electrically connected to the batteries, and a connector unit connecting the connection parts. The first to sixth connection tabs 150, 160, 170, 180, 190 and 191 may include conductive metals.

The first connection tab 150 may electrically connect at least two of the batteries. Referring to FIG. 6A, the first connection tab 150 may include a first connection part 151 electrically connected to the second battery 102, a second connection part 152 electrically connected to the third battery 103, and a first connector unit 153 connecting the first connection part 151 and the second connection part 152. Each of the first connection part 151 and the second connection part 152 may include a welding hole or soldering hole 150a. The first connection part 151 and the second connection part 152 may be fixed to the second battery 102 and the third battery 103 by welding or soldering. In addition, the first connector unit 153 may have one or more bent portions, according to an arrangement of the batteries, thereby increasing space utility efficiency.

The second connection tab 160 may include first stack connection parts 161 and 162, second stack connection parts 164 and 165 and a second connector unit 163.

The first stack connection parts 161 and 162 may electrically connect the batteries 101 and 102 of the first stack. The second stack connection parts 164 and 165 may electrically connect the batteries 104 and 105 of the second stack. The second connector unit 163 may connect the first stack connection parts 161 and 162 to the second stack connection parts 164 and 165. The second connector unit 163 may have one or more bent portions, according to, e.g., the number and configuration of the plurality of batteries 100a of the first and second stacks.

While FIG. 6B shows that the first stack connection parts 161 and 162 connect two batteries 101, 102 of the first stack, and the second stack connection parts 164 and 165 electrically connect the batteries 104 and 105 of the second stack the number of stack connection parts is not limited to two. For example, the first stack connection parts 161 and 162 and the second stack connection parts 164 and 165 may include a predetermined number (N) of connection parts electrically connecting a predetermined number (N) of batteries.

The second cell guide 122 may be integrally fixed with the first cell guide 121. Thus, even when a shock, e.g., a drop shock, is applied to the battery pack 100, relative movement between the first cell guide 121 and the second cell guide 122 may be prevented. As a result, contact failures between the second stack connection parts 164 and 165 and the batteries may be prevented, and breakage of the second connection tab 160 may be prevented.

Referring to FIG. 6C, the third connection tab 170 may include a third connection part 171 electrically connected to the third battery 103, a fourth connection part 173 electrically connected to the sixth battery 106, and a third connector unit 172 connecting the third connection part 171 and the fourth connection part 173.

In addition, the fourth connection tab 180 may electrically connect the fifth battery 105 and the sixth battery 106. In addition, the fifth connection tab 190 and the sixth connection tab 191 may be connected to the first battery 101 and the fourth battery 104, respectively, and the fifth connection tab 190 and the sixth connection tab 191 may be connected using a separate connector member 130. In addition, the connector member 130 may improve stability of the battery pack 100 by providing a temperature sensor or a fuse.

As described above, the battery pack, according to the embodiments, may have improved structural stability. Relative movement between cell stacks in the battery pack may be prevented by the cell guide, according to the embodiments. The cell guide, according to the embodiments, may include the first cell guide and the second cell guide disposed perpendicular to each other. The first cell guide and the second cell guide may be integrally formed with each other. In the cell guide, the relative movement between the first cell guide and the second cell guide may be prevented, thereby improving stability even against structural shocks. Even when the cell guide is subjected to structural shocks, the connection tabs may remain intact and avoid breakage, and contact failures between batteries may be prevented.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery pack, comprising:
 a plurality of batteries divided into first batteries in a first stack and second batteries in a second stack, the first stack being adjacent to the second stack;
 a circuit board electrically connected to the batteries;
 a cell guide between adjacent ones of the batteries, the cell guide including a first cell guide and a second cell guide, the first cell guide including support units for accommodating the first batteries, the second cell guide including a post extending from the first cell guide and projecting between the second batteries, and the first cell guide and the second cell guide being disposed perpendicular to each other and;

a case accommodating the plurality of batteries and the circuit board wherein:

the post of the second cell guide includes a plurality of battery mounting portions forming a groove extending through a center of the post, a thickness of each of the battery mounting portions gradually increases in a direction toward the first cell guide, and the groove correspondingly gradually decreases in size as the thickness of each of the battery mounting portions increases in a direction toward the first cell guide.

2. The battery pack as claimed in claim 1, wherein:

the support units accommodate the first batteries therebetween such that each of the first batteries is between two adjacent ones of the support units, and the first cell guide includes a first portion overlying each of the first batteries, and the first portion of the first cell guide is planar and supports the second cell guide thereon and has the support units thereunder.

3. The battery pack as claimed in claim 2, wherein the first cell guide is integrally formed with the second cell guide.

4. The battery pack as claimed in claim 2, wherein at least one side of one of the support units is connected to another of the support units adjacent thereto.

5. The battery pack as claimed in claim 2, wherein the support units have a shape corresponding to a shape of an outer surface of the first batteries.

6. The battery pack as claimed in claim 4, wherein the two adjacent ones of the support units form a semicircular cross section.

7. The battery pack as claimed in claim 1, wherein the first stack and the second stack are disposed perpendicular to each other.

8. The battery pack as claimed in claim 7, wherein the first stack and the second stack are connected by connection tabs in series, in parallel, or in a combination of series and parallel connections.

9. The battery pack as claimed in claim 8, wherein the connection tabs electrically connect at least two of the batteries, and each of the connection tabs includes connection parts electrically connected to the batteries and a connector unit connecting the connection parts.

10. The battery pack as claimed in claim 8, wherein each of the connection tabs includes:

first stack connection parts electrically connecting the first batteries of the first stack;

second stack connection parts electrically connecting the second batteries of the second stack; and a connector unit connecting the first stack connection parts and the second stack connection parts.

11. The battery pack as claimed in claim 10, wherein the connector unit includes one or more bent portions corresponding in position to the first stack and the second stack.

12. The battery pack as claimed in claim 10, wherein each of the first stack connection parts and the second stack connection parts include a predetermined number of connection parts electrically connecting a predetermined number of batteries.

13. The battery pack as claimed in claim 8, wherein the connection tabs are soldered or welded to the batteries.

14. The battery pack as claimed in claim 13, wherein each of the connection tabs includes a welding hole.

15. The battery pack as claimed in claim 1, wherein:

the circuit board is above the second stack such that both the first cell guide and the second cell guide are below the circuit board, and the circuit board is electrically connected to the batteries through a plurality or connectors thereunder.

16. The battery pack as claimed in claim 15, wherein the first cell guide, the second cell guide, and the plurality of connectors are housed within the case, and the plurality of connectors include:

a first connection tab that overlaps the first batteries, a second connection tab and a third connection tab that are separate from each other and that connect the first batteries to the second batteries, a fourth connection tab that overlaps the second batteries, a fifth connection tab coupled to one of the second batteries, and a sixth connection tab coupled to one of the first batteries, a separated connector member being connected between the fifth connection tab and the sixth connection tab.

17. The battery pack as claimed in claim 1, wherein the second stack includes at least a first cylindrical battery, a second cylindrical battery, and a third cylindrical battery, the first, second, and third cylindrical batteries each having a sidewall extending in a longitudinal direction thereof, and the post of the second cell guide contacts the respective sidewalls of each of the first, second, and third cylindrical batteries.

18. The battery pack as claimed in claim 17, wherein the post of the second cell guide has at least three concave battery mounting portions, each of the concave battery mounting portions contacting a respective sidewall of one of the first, second, and third cylindrical batteries.

19. The battery pack as claimed in claim 1, wherein;

the post includes a single groove extending though the center of the post, and the single groove is formed by the plurality of battery mounting portions.

* * * * *